United States Patent Office 3,283,034
Patented Nov. 1, 1966

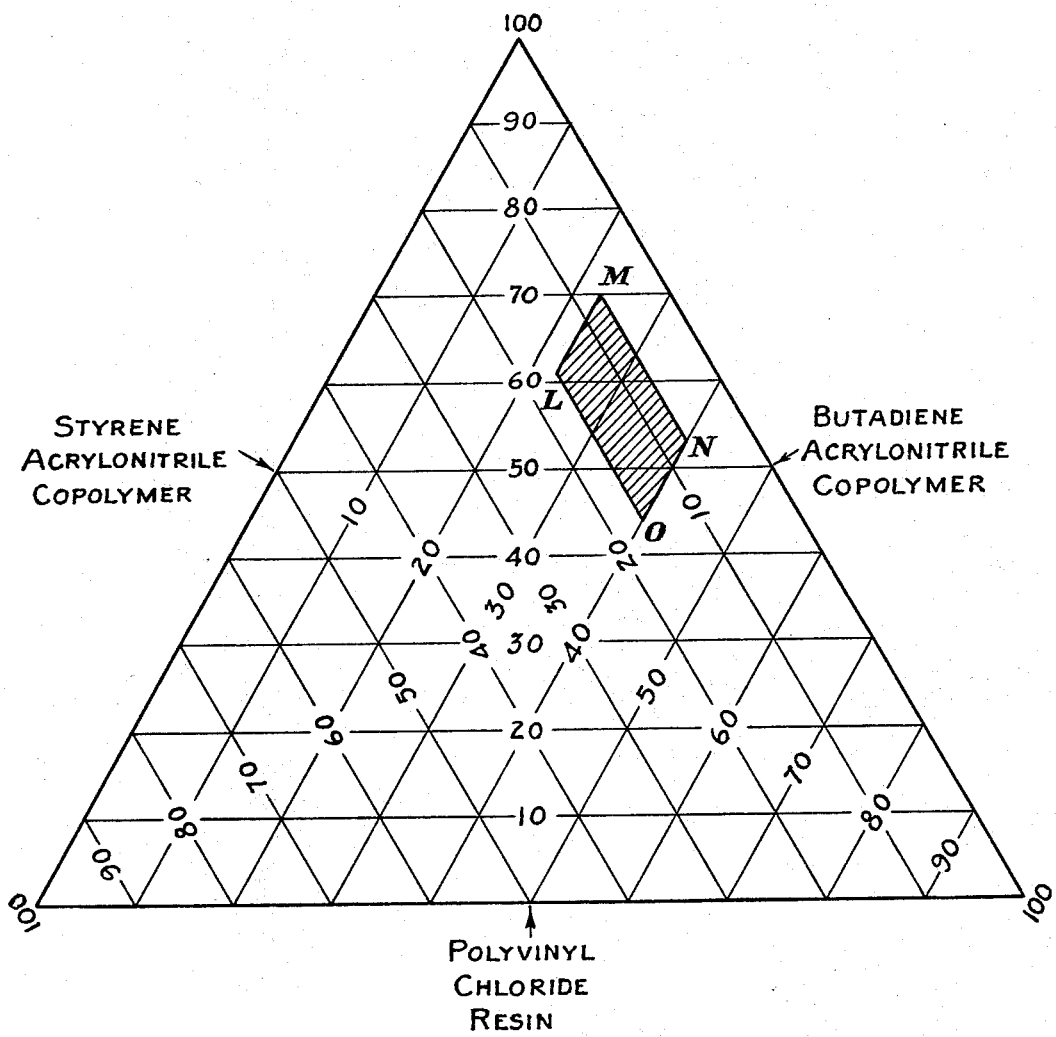

3,283,034
RIGID POLYVINYL CHLORIDE COMPOSITION
Anthony J. Urbanic, Akron, and Francis J. Maurer, Tallmadge, Ohio, assignors to The General Tire & Rubber Company, Akron, Ohio, a corporation of Ohio
Filed Feb. 7, 1963, Ser. No. 258,109
4 Claims. (Cl. 260—891)

This application is a continuation-in-part of prior copending application Serial No. 588,139, filed May 29, 1956, by A. J. Urbanic et al. and entitled "Rigid Polyvinyl Chloride Composition," which in turn was a continuation-in-part of then copending application Serial No. 532,885, filed September 7, 1955, both applications being now abandoned.

The present invention relates to rigid polyvinyl chloride compositions having the desirable solvent-resistant and fire-resistant characteristics of unplasticized polyvinyl chloride but being much more easily processed and having certain improved physical properties.

More particularly, the invention relates to the production of hard, tough, rigid, and colorless thermoplastic polyvinyl chloride (PVC) compositions which are easily processed by conventional operations such as milling, calendering and extruding and which, in addition, possess the ability to be injection molded and be formed and shaped into final products by techniques such as vacuum drawing, ring and plug forming, and the like. In other words, the polyvinyl chloride composition of the present invention can be injection molded, extruded, and deep drawn and yet still have many of the physical properties of the pure PVC resin.

The field of rigid, high molecular weight polyvinyl chloride plastics has been assuming considerable technical importance because of the inherent advantages of the polyvinyl chloride polymer as compared to other polymers such as styrene, polyethylene, and the like. However, the processing of unplasticized or rigid, high molecular weight polyvinyl chloride, hereinafter sometimes called PVC, is extremely difficult because the temperature at which it may be injection molded, extruded or calendered is very near its decomposition point. The difficulty is so great that only with special equipment having extremely good and accurate temperature control has a usable, rigid PVC product been made. Because the points of decomposition and of processability of PVC are so close together and because of the likelihood of decomposition, it is practically impossible to obtain reproducible light colored stocks.

Various PVC blends and compositions have been made such as those disclosed in U.S. Patent No. 2,646,417 of G. B. Jennings, issued July 21, 1953, but to our knowledge, no general purpose, rigid blend capable of being processed in conventional injection molding equipment and deep-drawing equipment has yet been devised.

It has heretofore been recognized that polyvinyl chloride may be plasticized with a rubbery copolymer of 60 to 70 parts of butadiene and 30 to 40 parts of acrylonitrile. The product so produced, however, is a flexible material quite similar to ester plasticized polyvinyl chloride and is used for coating such items as textiles, etc. or for making film or sheeting and the like. The relatively high percentage of acrylonitrile in the rubbery plasticizer is required to provide a high degree of compatibility between the rubbery copolymer and the polyvinyl chloride and thus provide efficient plasticizing action. The amount of plasticizer present in the composition was generally equal to the weight of the vinyl chloride although it could be varied between 70 to 30 percent of the weight of the vinyl chloride to obtain certain characteristics. Any polyvinyl chloride composition having less than 30 percent of such rubbery plasticizer was considered to be of little, if any, utility and undesirable.

It has also heretofore been recognized that styrene and acrylonitrile copolymers, styrene and methacrylonitrile copolymers and other copolymer mixtures could be added to polyvinyl chloride compositions in amounts up to 40 parts of the styrene-acrylonitrile copolymer for each 100 parts of polyvinyl chloride polymer and copolymer and that a polyvinyl chloride composition with superior processing characteristics resulted. The preferred amount of styrene-acrylonitrile copolymer was from 1 to 20 parts per 100 parts of polyvinyl chloride. While such compositions were characterized by superior processing characteristics, they still could not be deep drawn satisfactorily and could not be injection molded without using a special machine with accurate temperature controls and a heated screw. As a matter of fact, only one commercially available injection molding machine was capable of handling such compositions and it was a specialized, expensive machine.

It is an object of this invention to provide a rigid polyvinyl chloride composition which retains most of the physical characteristics of polyvinyl chloride resin but which may be processed much more readily and easily than is unmodified polyvinyl chloride resin.

It is another object of this invention to provide a polyvinyl chloride composition which has good calendering properties, high impact strength, and good drawing properties.

Still another object of this invention is to provide a polyvinyl chloride composition which can be injection molded in conventional injection molding equipment such as is now being used for polystyrene, and vacuum formed on equipment such as is now being used for cellulosics, styrene alloys, and other similar thermoplastic sheet materials and which maintains bright, clear colors throughout such processing.

Other objects and advantages will be apparent from the following description of the invention and the accomanying drawing which is a trilinear diagram showing the range of proportions of the constituents of the compositions of this invention, each one of the proportions starting at 0% at one of the base lines and gradually increasing to 100% at its vertice. Specifically, the base line for polyvinyl chloride is the horizontal base line shown in the diagram. Any point on the horizontal base line represents a composition with 0% by weight of polyvinyl chloride. A point on the next adjacent horizontal line (parallel to the horizontal base line) represents compositions with 10% by weight of polyvinyl chloride. Thus, any point within the trapezoidal area formed by lines LM, MN, NO, and LO represents a composition within the scope of the present invention.

The rigid, tough, general purpose composition of the present invention comprises (a) 44 to 70 percent by weight of polyvinyl chloride or vinyl chloride copolymers composed principally of vinyl chloride, (b) from 23 to 40 percent by weight of a resinous copolymer of a polymerizible mono-olefinic material such as styrene or a homopolymerizable substituted styrene and a compatible, copolymerizable mono-olefinic nitrile such as acrylonitrile and/or methacrylonitrile which resinous copolymer preferably contains 60 to 85 parts by weight of combined styrene and 40 to 15 parts by weight of combined nitrile, and (c) from 7 to 16 and preferably 10 to 15 percent by weight of a rubbery copolymer of a conjugated diolefinic compound such as chloroprene, isoprene and butadiene with an acrylonitrile which rubber compound preferably has compatibility with the resinous copolymer as is hereinafter described.

By rigid is meant a compound with flexural modulus of over 100,000 p.s.i. Compounds of the present invention can be injection molded on injection molding machines such as are generally found in polystyrene injection molding plants and can be deep drawn on conventional vacuum forming and deep drawing equipment.

At the same time, the inherent advantages of polyvinyl chloride such as flame resistance, hardness and resistance to solvents, acids and bases are preserved and maintained. Thus the compositions of the present invention, for the first time, provide a polyvinyl chloride based resin suitable for injection molding and deep drawing.

Polyvinyl chloride may be substituted in whole or in part by other vinyl halide resins and copolymers composed predominately of a polymerized vinyl halide. This includes copolymers and interpolymers of vinyl halides and copolymerizable mono-olefins such as, for example, vinylidene chloride and vinylidene bromide, vinyl esters, for example, vinyl acetate, vinyl propionate, and alpha alkyl acrylic acids, their alkyl esters, and their nitriles, for example, acrylic acid, methyl acrylate, ethyl acrylate, acrylonitrile, methacrylonitrile, and the like. In any case, the vinyl halide should constitute at least 70% by weight of the copolymer compound and preferably at least 90% by weight of the copolymer compound. In any event, the preferred range of the polyvinyl chloride polymer or copolymer compound is from 40 to 60 parts by weight for every 100 parts of the total composition of the present invention.

The polyvinyl halide is preferably prepared by a suspension polymerization system, but, of course, may be prepared by emulsion system or otherwise as is well known in the art. The intrinsic viscosity of the polyvinyl chloride is preferably from 1.00 to 1.10 in cyclohexanone at 25° C. but may actually cover a wide range.

The styrene-acrylonitrile copolymer portion preferably contains from 60 to 85% styrene and 40 to 15% acrylonitrile by weight of the copolymer. The copolymer preferably is added in amounts of 50 to 120 parts by weight for every 100 parts of polyvinyl chloride. It should be observed that ordinarily such high amounts of styrene copolymer could not be added to the polyvinyl chloride without a serious loss in physical characteristics of the resultant blend as clearly shown in U.S. Patent 2,646,417 previously noted. By utilizing a rubbery copolymer in conjunction with the styrene copolymer and by obtaining a total and balanced amount of solubilizing groups in the styrene copolymer and the rubbery polymer, however, we have been able to achieve the superior composition of the present invention.

In the styrene-acrylonitrile copolymer, the styrene may be replaced by nuclear-substituted styrene homologs such as 3,4-dichlorostyrene, dimethylstyrene, etc. The non-homopolymerizable alphamethylstyrene, alpha methoxy styrene, 3,4-dichloro alphamethylstyrene and other alpha-methylstyrenes produce considerably different properties in the resin, giving much higher heat distortion and requiring somewhat more or different type of rubbery component. Likewise, acrylonitrile may be replaced by methacrylonitrile, ethacrylonitrile, chloroacrylonitrile, and other copolymerizable nitriles of an alpha substituted, beta unsaturated acid having less than six aliphatic carbon atoms.

The rubbery copolymer preferably comprises 15 to 25 percent by weight of the polyvinyl chloride or approximately 10 to 15 percent by weight of the total of polyvinyl chloride and styrene-acrylonitrile copolymer. While even 7 or 8 percent of rubbery polymer in the total polyvinyl chlorlide and styrene copolymer composition produces significant benefits, the full advantage is not obtained until from 10 to 15 percent are added. Over 16 percent are undesirable because it lowers the heat distortion and rigidity of the blend and seriously lessens light or ultra violet stability.

The butadiene may be replaced in whole or part by other polymerizable conjugated diolefins such as isoprene, 2,3-dimethyl butadiene etc. and the polymerizable substituted diolefins, such for example as cyanoprene, chloroprene, 2-phenyl butadiene-1,3 and the like, all of which diolefinic compounds preferably have less than 8 aliphatic carbon atoms.

The mono-olefinic component of the rubbery copolymer should contain a solubilizing group such as the nitrile group. Examples of suitable olefinic compounds containing a nitrile group are vinyl cyanide or acrylonitrile, methacrylonitrile, and the like. Other suitable mono-olefinic components for both the rubbery and resin copolymers are nitriles copolymerizable with a conjugated diolefin and being derived from a beta unsaturated monocarboxylic acid having less than six aliphatic carbon atoms. The copolymerizable nitrile may be derived from a beta unsaturated acid having less than six aliphatic carbon atoms which is substituted in the alpha position by alkyl groups such as methyl, ethyl and propyl.

The viscosity of the rubbery copolymer is preferably held within the range of 30 to 60 Mooney when measured at 212° F. at four minutes with a large rotor. In order to standardize the product, it is usually desirable that the four minute Mooney viscosity will be held within the range of 35 to 50. The rubbery copolymer should contain from 60 to 85% by weight of butadiene-1,3 or other polymerizable conjugated diolefin having less than 8 aliphatic carbon atoms and 40 to 15 percent of acryonitrile or methacrylonitrile etc.

The rubber copolymer should be relatively free of fatty acids and fatty acid soaps if blooming is to be avoided in the product. All polymers in the composition preferably should be polymerized in a low soap recipe or one in which soap has been entirely or largely replaced by a non-fatty acid and non-rosin acid detergent such as sodium lauryl sulfate or one of the other suitable non-precipitating detergents acceptable in emulsion polymerization systems. The emulsion procedures are preferred for preparing the rubbery copolymer component. Such procedures may be identical to any of those used in making GR-S types of rubbers except that the butadiene and styrene of the GR-S is substituted by the desired mixture of diolefinic compound and monomer or monomers containing cyano groups.

It has been found that the rubber should have limited compatibility for good processing and impact in the final product. While the limited compatibility with PVC for the rubber component of the present invention may be obtained by copolymerizing two or more butadiene compounds alone such as butadiene and/or isoprene with cyanoprene in proportions to form a polymer with one cyano group for each 11 to 30 carbon atoms, it is generally preferable to accomplish it by proportioning a diolefinic component and a mono-olefinic component containing a nitrile solubilizing group to provide one such group for each 11 to 30 carbon atoms. The mono-olefinic component of the rubbery plasticizer, which is necessary when it contains the only solubilizing group, may be any one or more mono-olefins having nitrile groups.

The plasticizing high polymer or rubber is considered to be made up of a hydrocarbon portion similar to ordinary rubber and solubilizing groups. The hydrocarbon portion has no desire to become mixed with the polyvinyl chloride and effectively resists all attempts as illustrated by the fact that all attempts to prepare a homogeneous mixture of natural or GR-S rubber and polyvinyl chloride have been unsuccessful even though solutions of the two materials are combined. Nitrile groups, on the other hand, act as solubilizing groups and have great affinity for the polyvinyl chloride, and much more affinity than for the hydrocarbon portion. Except for the fact that they are attached to the long hydrocarbon chain, they would go entirely into the polyvinyl chloride. There is, therefore, in the plasticizer a struggle between the pull of the polar or solubilizing groups to go into the polyvinyl chloride and the pull of hydrocarbon to stay out. The pull of the solubilizing groups varies as their number. The strength of the pull of the hydrocarbon portion varies as the size of the molecule or number of carbon atoms. When the two forces are balanced just right, one may obtain the optimum properties of a rigid plastic set forth herein.

The carbon atoms in the chain are more effective in increasing size than are the carbons dangling therefrom as a side chain and appear to be about twice as effective. Therefore, in considering the carbon atoms of the plasticizer molecule, one should consider all of the carbon atoms directly making up the polymer chain plus ½ of the carbons in dependent aliphatic side chains and ⅓ of the carbons in dependent aromatic groups.

In the case of acrylonitrile, each mole adds only 2 carbons and one nitrile group is attached. The solubilizing groups should be spaced as uniformly as possible about the chain for the greatest benefit. Such spacing is best obtainable by copolymerization processes.

On a weight basis, the vinyl cyanide is a potent compatibility producing or solubilizing agent. On a mol basis, however, it is found that the nitrile groups are reasonably equivalent and should be spaced about the same in the average plasticizer molecule. For best results in producing a high impact rigid polyvinyl halide composition in accordance with the above objects, there should be one cyanide (nitrile) group for each 14 to 21 carbon atoms in the high polymer chain or molecule of the rubbery component, and optimum results are obtained when there is one nitrile group for about each 17 or 18 carbon atoms. When there is more than one nitrile group for each 10 or 11 carbons, the rubbery component becomes too compatible, heat distortion is too low for many applications and some of the most desirable properties are not obtained. Even when the number of solubilizing groups (i.e., polar groups such as —CN) is such that there is as many as one for each 12.5 carbons, the properties of the plasticized rigid polymer are considerably below the optimum. This is in marked contrast to the cases where the nitrile rubber is used in larger amounts as a conventional plasticizer to produce flexible films.

The average spacing of the solubilizing groups in a copolymer of only two monomers, one of which is a conjugated diolefin (having 4 carbon atoms in the direct chain) designated below by the letter A and the other of which is a mono-olefinic compound (having 2 carbon atoms in the direct chain) designated below by the letter B containing one solubilizing group per molecule, may be obtained from the following general formula:

No. of carbon atoms per solubilizing group =

$$\frac{A'\left(4+\frac{C}{2}\right)+B'\left(2+\frac{D}{2}\right)}{B'\,(1)}$$

where A' is the molepercent of diolefin A in the copolymer; i.e., the weight percentage of diolefin A divided by molecular weight of diolefin A.

B' is the mol percent of the mono-olefinic compound in the copolymers; i.e., percentage by weight of mono-olefinic compound divided by the molecular weight of the mono-olefinic compound.

C is the number of the side chain carbon atoms in a molecule of the diolefin; i.e., total carbon atoms outside of any solubilizing groups minus 4.

D is the carbon atoms in the side chain hydrocarbon groups of the mono-olefinic compound; i.e., total carbon atoms of the mono-olefinic compound outside of the solubilizing groups minus 2.

In the general case where there may be more than two monomers any of which may contain solubilizing groups, the number of carbon atoms per solubilizing group is the quotient obtained by dividing S, which is the sum of the products obtained by multiplying the mol percent of each monomer by a quantity equal to the number of carbon atoms in its main chain plus one-half the number of carbons in its side chain hydrocarbon groups, by 0 which is the sum of the products obtained by multiplying the mol percent of each monomer by the number of solubilizing groups such monomer contains.

In a copolymer prepared by copolymerization 75 parts by weight of butadiene-1,3 and 25 parts of vinyl cyanide, the mol percent of butadiene present is $75/54$. The number of carbon atoms directly in the chain of butadiene as in the case of all conjugated diolefinic compounds is 4. The number of side chain carbon atoms in the case of butadiene is 0. The number of solubilizing groups in butadiene is 0. The mol percent of vinyl cyanide is $25/53$. The number of direct chain atoms of vinyl cyanide is 2. The number of side chain carbon atoms is 0 since the carbon atom of the solubilizing group itself is not counted. The number of solubilizing groups in vinyl cyanide is 1.

The number "N" of carbon atoms per solubilizing groups is, therefore, obtained by the following expression:

$$N=\frac{\frac{75}{54}\times 4+\frac{25}{53}\times 2}{\frac{25}{53}\times 1+\frac{75}{54}\times 0}=\text{approx. }14$$

The following Table I shows the number of carbon atoms or solubilizing group in copolymers with a designated percent of butadiene and vinyl cyanide to be blended with the polyvinyl chloride and the styrene-acrylonitrile copolymer:

TABLE I

| Polymer | Percent Butadiene in copolymer | Percent Vinyl Cyanide in copolymer | Approx. No. of Carbon per Solubilizing Group |
| --- | --- | --- | --- |
| 1 | 85 | 15 | 25 |
| 2 | 76 | 24 | 14.5 |
| 3 | 67 | 33 | 10 |
| 4 | 70 | 30 | 11 |
| 5 | 80 | 20 | 18 |

The molecular weight and size of the plasticizer molecule is also of great importance. High polymers having an average molecular weight of at least about 4,000 to 5,000 and preferably 10,000 or above have much less migratory or fleeting tendencies than have low molecular weight polymers. An increased size of molecule decreases mobility and, is, therefore, preferable from that standpoint. Above a certain point, however, increased size increases rigidity of the rubbery material itself so that it has less plasticizing action. Somewhat more of an extremely high molecular weight or tough rubber is required to obtain optimum properties than is required when a lower molecular weight polymer is used. Rubbery polymers of any obtainable molecular weight may, however, be used in the practice of this invention.

The following examples in which parts are by weight illustrate the present invention:

EXAMPLE I

| | Parts |
| --- | --- |
| Butadiene | 80 |
| Vinyl Cyanide | 20 |
| Water | 190 |
| Sodium Lauryl Sulfate | 3 |
| $K_2S_2O_8$ | 0.1 |
| Tri-sodium Phosphate | 0.1 |
| Mixed Tertiary Mercaptans | 0.8 |

The above ingredients were incorporated in a closed autoclave equipped with suitable temperature controls and mixing or agitation means similar to that used in the production of the Government synthetic rubber of the GR-S type. The ingredients were maintained under agitation at 35° C. for 17 hours at which time the conversion was 100 percent. 0.25 part of sodium sulfide was thereupon mixed into the latex to stabilize it against further reaction.

EXAMPLE II

Polyvinylchloride was mixed with a resinous 72 styrene-28 acrylonitrile copolymer, and a rubbery 80 butadiene-1,3/20 acrylonitrile copolymer. The rubbery component was the rubber of Example I, above.

The basic recipe was as follows:

| | Parts |
|---|---|
| PVC | 65 |
| Resinous component | 35 |
| Stabilizer | 4.0 |
| Rubbery component | 13.5 |
| Antioxidant | 0.5 |

The test results were as follows:

TABLE II

| Resinous Component Composition, Percent | Rubbery Component Composition, Percent | Notched Izod Impact, ft.-lbs./in. | Heat Distortion 264 p.s.i. in ° C. | Rockwell "R" Hardness | Tensile, p.s.i. |
|---|---|---|---|---|---|
| 72 Styrene 28 VCN | 80 Bd 20 VCN | 2.31 | 74 | 103 | 5,900 |

In the above table, Bd is a symbol for butadiene; and VCN, for vinyl cyanide.

EXAMPLE III

This example is similar to Example II, above. Blends of polyvinyl chloride, styrene-acrylonitrile resinous copolymer, and butadiene-1,3-acrylonitrile rubbery copolymer were prepared and tested. The results are shown below:

| Material | Composition, Parts by Weight | |
|---|---|---|
| | III-1 | III-2 |
| Polyvinyl chloride resin [1] | *70 (63.6) | *60 (54.5) |
| 72 styrene/28 acrylontrile resinous copolymer [2] | *30 (27.3) | *40 (36.4) |
| 80 butadiene-1,3/20 acrylonitrile rubbery copolymer [3] | *10 (9.1) | *10 (9.1) |
| Lead stabilizer [4] | 5.5 | 5.5 |
| Phenolic type antioxidant [5] | 0.4 | 0.4 |
| Calcium stearate | 0.6 | 0.6 |
| Flow area at 180° C. in sq. in. (samples of equal volume were used) | 6.5 | 5.9 |

[1] Geon 103, The B. F. Goodrich Co.
[2] BMC-11, Union Carbide Corp.
[3] Contains 10% by weight of polyvinyl chloride resin added to latex prior to coagulation to prevent excessive agglomeration of the rubber. Parts by weight not adjusted for this amount of PVC.
[4] Dyphos, National Lead Co.
[5] Santo white crystals, Monsanto Chem. Co.
*Based on 100% total composition of PVC, STV-VCN, and BDN-VCN.

These results show the excellent flow properties of compositions of the present invention.

EXAMPLE IV

This example is similar to Example II, above. Additional blends of polyvinyl chloride, styrene-acrylonitrile resinous copolymer, and butadiene-1,3-acrylonitrile rubbery copolymer were prepared and tested. The results are shown below:

| Material | Compositions, Parts by Weight | | |
|---|---|---|---|
| | IV-1 | IV-2 | IV-3 |
| Polyvinyl chloride resin [1] | *65 (59.1) | *65 (58) | *65 (56.5) |
| Styrene-acrylonitrile resin [2] | *35 (31.8) | *35 (31.3) | *35 (30.4) |
| Butadiene-acrylonitrile rubber [3] | *10 (9.1) | *12 (10.7) | *15 (13.1) |
| Barrium-cadmium stabilizer [4] | 3 | 3 | 3 |
| Phenolic type antioxidant [5] | 0.4 | 0.4 | 0.4 |
| Heat distortion at 264 p.s.i. in 0° C. | 75 | 76 | 71.5 |
| Notched Izod, foot-lbs./in. | 0.69 | 0.54 | 4.28 |
| Flexural strength (p.s.i.) | 13,854 | 13,871 | 14,615 |
| Rockwell "R" Hardness | 111 | 110 | 106 |
| Processing | Good | Good | Good |

[1] Geon 103 EP, The B. F. Goodrich Co.
[2] Same as Example III.
[3] Same as Example III.
[4] Solid stabilizer, Advance Solvents Co.
[5] Same as Example III.
*Based on 100% total composition of PVC, STY-VCN and BDN-VCN.

EXAMPLE V

This example is similar to Example II, above. More blends of polyvinyl chloride resin, styrene-acrylonitrile resinous copolymer, and butadiene-1,3/acrylonitrile rubbery copolymer were prepared and tested. The results are shown below:

| Material | Compositions, Parts by Weight | |
|---|---|---|
| | V-1 | V-2 |
| Polyvinyl chloride [1] | *65 (57.3) | *60 (52.9) |
| Styrene-acrylonitrile resin [2] | *35 (30.8) | *40 (35.2) |
| 80 Butadiene-20 acrylonitrile rubber [3] | *13.5 (11.9) | |
| 80 Butadiene-20 acrylonitrile [4] | | *13.5 (11.9) |
| Barium-cadmium stabilizer [5] | 4.0 | 4.0 |
| Phenolic type antioxidant [6] | 0.4 | 0.4 |
| Heat distortion at 264 p.s.i. in 0° C. | 78 | 79 |
| Notched Izod, foot-lbs./in. | 4.9 | 3.24 |
| Hardness, Rockwell "R" | 107 | 104 |
| Flexural strength, p.s.i. | ND | 9,200 |
| Processing | Good | Very Good |
| Vacuum forming | Good | Very Good |

[1] Vygen 110, the General Tire & Rubber Co.
[2] Same as Example III.
[3] Paracril AJ, The U.S. Rubber Co.
[4] Laboratory copolymer, rubbery.
[5] Same as Example IV.
[6] Same as Example III.
*Based on 100% total composition of PVC, STY-VCN, and BDN-VCN.
ND—Not determined.

The results of Examples IV and V also show the excellent physical and processing properties of the present blends.

EXAMPLE VI

This example is similar to Example II, above, except that compositions were also prepared in which a rubbery terpolymer was used in place of the rubbery copolymer to show the unexpected superiority of compositions containing the rubbery copolymer. The compositions contained polyvinyl chloride, a resinous copolymer of styrene and acrylonitrile, and a rubbery terpolymer of butadiene-1,3, acrylonitrile and styrene or copolymer of butadiene-1,3 and acrylonitrile. The polyvinyl chloride resin and styrene-acrylonitrile resin were preblended in a mixer, the preblend was then mixed on a hot mill and next the rubber was added along with minor amounts of a stabilizer and antioxidant while being mixed and heated on the mill. The mill mixed compositions were then sheeted out; samples cut from the same; and the samples molded and fused. The molded samples were then tested as to impact resistance at 0° F. and −20° F. The components of the composition in parts by weight, the ratios of monomers in the styrene-acrylonitrile resin and in the rubbers, and the results obtained are shown below:

TABLE III

[(A) Using rubbery terpolymer]

| Composition | | | Notched Izod impact in ft.-lbs./in. at— | |
|---|---|---|---|---|
| Polyvinyl chloride resin | 72 styrene-28 acrylonitrile resinous copolymer | 67 butadiene-16 acrylonitrile-17 styrene rubbery terpolymer | 0° F. | −20° F. |
| (a) 56 | 32 | 12 | 1.75 | 1.82 |
| (b) 48 | 40 | 12 | 1.70 | 1.60 |

[(B) Using rubbery copolymer]

| Composition | | | Notched Izod impact in ft.-lbs./in. at— | |
|---|---|---|---|---|
| Polyvinyl chloride resin | 72 styrene-28 acrylonitrile resinous copolymer | 82 butadiene-18 acrylonitrile rubbery copolymer | 0° F. | −20° F. |
| (a) 56 | 32 | 12 | 2.51 | 2.79 |
| (b) 48 | 40 | 12 | 2.17 | 2.21 |

The above data show that composition B(a) exhibits a 43% improvement in Izod impact at 0° F. over composition A(a) while composition B(b) gives a 28% improvement in Izod impact at 0° F. over composition A(b). Compostion B(a) shows a 53% improvement in Izod impact at −20° F. over composition A(a) and composition B(b) shows a 38% improvement in Izod impact at −20° F. over composition A(b). On the average, composition B(a & b) show an improvement of 40% in Izod impact over compositions A(a & b). These results, obtained by using a rubbery copolymer, are unexpected and clearly show that compositions A(a & b) are not equivalent to compositions B(a & b) of the present invention.

EXAMPLE VII

This example is similar to Example II, above, except that still other compositions were prepared in which a rubbery terpolymer was used in place of the rubbery copolymer for comparative purposes. Compositions were prepared containing polyvinyl chloride, a resinous copolymer of styrene and acrylonitrile, and a rubbery copolymer of butadiene-1,3, and acrylonitrile or a rubbery terpolymer. The polyvinyl chloride resin and styrene-acrylonitrile resin were preblended in a mixer, the preblend was then mixed on a hot mill and next the rubber was added along with minor amounts of a stabilizer and antioxidant while being mixed and fused on the mill at 350° F. The mill mixed compositions were then sheeted out; test specimens were machined from ¼″ slabs which were prepared by laminating 70 mil thick sheets at a temperature of 350° F. for 20 minutes under a pressure of 500 p.s.i. The molded samples were then tested as to impact resistance at 73° F., 0° F., and −20° F. The components of the composition in parts by weight, the ratios of monomers in the styrene-acrylonitrile resin and in the rubbers, and the results obtained are shown below:

TABLE IV

| | Composition | | | Notched Izod impact in foot-pounds per inch at— | | |
|---|---|---|---|---|---|---|
| Run | Polyvinyl chloride, percent by wt.[1] | 72% styrene-28% acrylonitrile copolymer resin, percent by wt.[2] | Rubber, percent by Weight | 73° F. | 0° F. | −20° F. |
| A | 65 | 23 | [3] 12 | 11.7 | 2.98 | 2.89 |
| B | 56 | 32 | [3] 12 | 8.2 | 2.51 | 2.79 |
| C | 48 | 40 | [3] 12 | 5.4 | 2.17 | 2.21 |
| AV | | | | 8.4 | 2.55 | 2.63 |
| D | 65 | 23 | [4] 12 | 1.14 | ([6]) | 0.59 |
| E | 56 | 32 | [4] 12 | 0.75 | ([6]) | 0.50 |
| F | 48 | 40 | [4] 12 | 0.77 | ([6]) | 0.55 |
| AV | | | | .89 | | .55 |
| G | 65 | 23 | [5] 12 | 14.1 | 2.74 | 3.29 |
| H | 56 | 32 | [5] 12 | 8.1 | 1.75 | 1.82 |
| I | 48 | 40 | [5] 12 | 7.0 | 1.70 | 1.60 |
| AV | | | | 9.7 | 2.06 | 2.24 |

[1] Vygen 110, The General Tire & Rubber Co.
[2] BMC-11, The Union Carbide Corp.
[3] 82% butadiene-1,3 and 18% acrylonitrile rubber copolymer.
[4] 67% butadiene-1,3 and 33% acrylonitrile rubber copolymer, Hycar 1052, The B. F. Goodrich Co.
[5] 67% butadiene-1,3, 17% styrene, and 16% acrylonitrile rubber terpolymer.
[6] Not tested due to low impacts obtained at 73° F. and −20° F.

At 73° F. the average of the impact resistances of the above compositions A–C are much greater than the average of the impact resistances of compositions D–F and they are almost comparable to the average of the impact resistances of compositions G–I.

At 0° F. the average of the impact resistances of compositions A–C are much greater than the average of the impact resistance which could reasonably be expected from compositions D–F. Although the impact resistances of D–F at 0° F. were not actually determined, it can be seen that since the impact resistances of D–F at 73° F. and −20° F. are quite low, the impact resistances of D–F at 0° F. will lie between their impact resistances at 73° F. and −20° F. This reasoning is valid in view of the generally decreasing impact resistances of the other compositions as the temperatures are reduced. The average of the impact resistances of composition A–C are clearly superior to the average of the impact resistances of compositions G–I. In fact the average of the impact resistances of compositions A–C is 24% better than the average of the impact resistances of compositions G–I.

At −20°F. it is seen that the average of the impact resistances of compositions A–C are much better than the average of the impact resistances of compositions D–F. The average of the impact resistance of compositions A–C is in fact 378% better than the average of the impact resistances of compositions D–F. It, also, is seen that the average of the impact resistances of compositions A–C are much better than the average of the impact resistances of compositions G–I. Moreover, the average of the impact resistances of compositions A–C is 17% better than the average of the impact resistances of compositions G–I.

If these compositions are compared on a one-to-one basis, for example, A compared with D and A compared with G, etc., for the same proportions of polymers in the compositions at the same temperature, it is seen that out of a total of 18 possible comparisons, compositions A–C were much better than compositions D–F and G–I in 15 of such comparisons; and compositions A–C show much better impact resistance at the lower temperatures as compared to compositions D–F and G–I. These results clearly demonstrate that compositions A–C provide new and unexpected results as compared to compositions D–F and G–I.

What is claimed is:

1. A rigid, tough, general purpose, thermoplastic composition of (a) 44 to 70 percent by weight of a compound selected from the group consisting of polyvinyl chloride and copolymers composed of at least 70% by weight of vinyl chloride and the balance another copolymerizable monoolefinic monomer, (b) 23 to 40 percent by weight of a copolymer consisting of (1) a compound selected from the group consisting of styrene and alpha- and nuclear-substituted alkyl and chloro-styrenes and (2) an acrylonitrile, said copolymer containing from 15 to 40 percent by weight of said nitrile, and (c) 7 to 16 percent by weight of a rubbery copolymer consisting of a polymerizable conjugated diolefin having less than eight aliphatic carbon atoms and acrylonitrile, said rubbery copolymer having a nitrile radical for each 11 to 30 carbon atoms in the direct chains of said copolymer.

2. A rigid, tough, general purpose, thermoplastic composition of (a) 45 to 67 percent by weight of a compound selected from the group consitsing of at least one polyvinyl chloride and copolymers composed of at least 70% by weight of vinyl chloride and the balance another copolymerizable monoolefinic monomer, (b) 23 to 40 percent by weight of a copolymer consisting of (1) a compound selected from the group consisting of styrene and alpha and nuclear-substituted alkyl and chloro-styrenes and (2) a copolymerizable acrylonitrile, said copolymer containing from 15 to 40 percent by weight of said nitrile, and (c) 10 to 15 percent by weight of a rubbery copolymer consisting of a polymerizable conjugated diolefin having less than eight aliphatic carbon atoms and acrylonitrile, said rubbery copolymer having a nitrile radical for each 11 to 30 carbon atoms in the direct chains of said copolymer.

3. A rigid, tough thermoplastic composition of (a) 45 to 67 percent by weight of polyvinyl chloride, (b) 23 to 40 percent by weight of a styrene-acrylonitrile copolymer containing from 15 to 40 percent by weight of acrylonitrile, and (c) 10 to 15 percent by weight of a rubbery copolymer consisting of butadiene and acrylonitrile, said rubbery copolymer having a —CN group for each 11 to 30 carbon chain atoms in the direct chains of said copolymer.

4. A rigid, tough thermoplastic composition of (a) 44 to 70 percent by weight of polyvinyl chloride, (b) 23 to 40 percent by weight of a styrene-acrylonitrile copolymer containing from 15 to 40 percent by weight of acrylonitrile, and (c) 7 to 16 percent by weight of a rubbery copolymer consisting of butadiene and acrylonitrile, said rubbery copolymer having a —CN group for each 11 to 30 carbon chain atoms in the direct chains of said copolymer.

References Cited by the Examiner

UNITED STATES PATENTS

| | | | |
|---|---|---|---|
| 2,753,322 | 7/1956 | Parks et al. | 260—891 |
| 2,808,387 | 10/1957 | Parks et al. | 260—891 |
| 2,924,545 | 2/1960 | Daly | 260—891 |

MURRAY TILLMAN, *Primary Examiner.*

SAMUEL H. BLECH, *Examiner.*

D. J. BREZNER, *Assistant Examiner.*